July 23, 1957      G. C. LUEBKEMAN      2,799,936
BINOCULAR SHOOTING AID
Filed Aug. 8, 1952
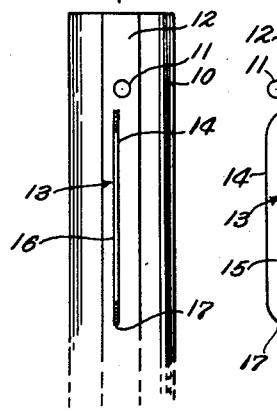
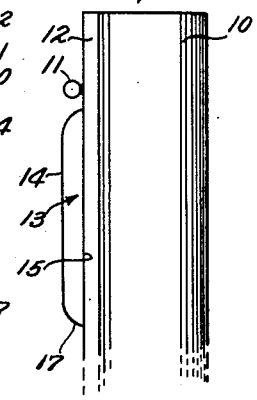
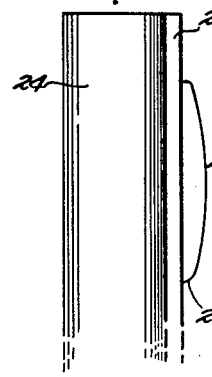
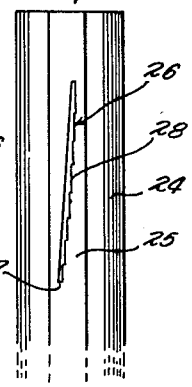
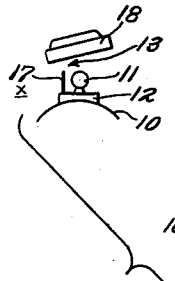
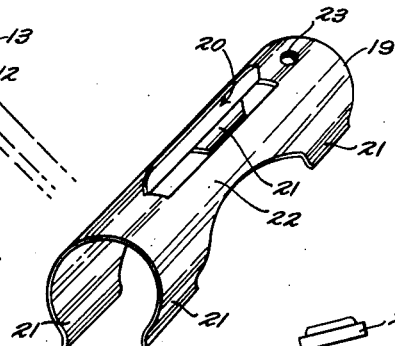
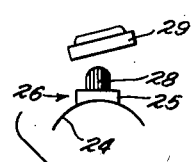
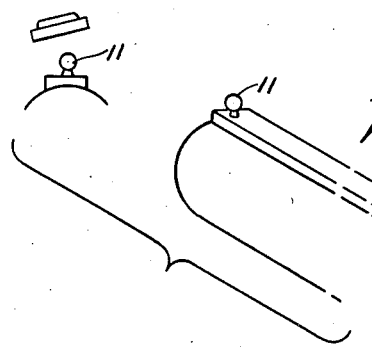
INVENTOR.
George C. Luebkeman
BY
Murray, Sachhoff + Murray
ATT'YS

United States Patent Office 2,799,936
Patented July 23, 1957

2,799,936
BINOCULAR SHOOTING AID

George C. Luebkeman, Cincinnati, Ohio

Application August 8, 1952, Serial No. 303,373

2 Claims. (Cl. 33—52)

The present invention relates to the art of shooting a gun, particularly at a moving target and using binocular vision as recommended by expert wing shooters.

An object of the invention is to provide a binocular shooting aid which is small and which imposes no handicap on or hindrance to any operation or use of the gun and which eliminates the confustion and difficulties commonly experienced in binocular shooting with a conventionally arranged gun according to recommended methods, or with the use of heretofore proposed aids to binocular shooting.

It is a special object of the invention to provide an aid to binocular shooting which gives the gunner full command of the target area and target and at the same time presents to the respective eyes during binocular aiming a different image of the front sight or its equivalent so that it is impossible to become confused and to mistakenly align the front sight and the target with the wrong eye.

These and other important objects and advantages are attained by the means described herein and exemplified in the accompanying drawing, in which:

Fig. 1 is a top plan view of the forward end of a shotgun barrel having one form of the binocular shooting aid of the invention permanently attached thereto.

Fig. 2 is a side elevational view of the structure of Fig. 1.

Fig. 3 is a schematic representation showing at the left side the images as seen by both eyes simultaneously or by the right eye alone in using the device of Fig. 1, and showing at the right side the images as seen by the left eye alone.

Fig. 4 is a top plan view of the forward end of a shotgun barrel having an alternative form of the binocular shooting aid of the invention permanently attached thereto.

Fig. 5 is a side elevational view of the structure of Fig. 4.

Fig. 6 is a schematic representation showing at the left side the images as seen by both eyes simultaneously or by the right eye alone in using the device of Fig. 4, and showing at the right side the images as seen by the left eye alone.

Fig. 7 is a schematic representation corresponding with Figs. 3 and 6 and showing the images as presented using a conventional shotgun.

Fig. 8 is a perspective view of a removable form of binocular shooting aid of the invention corresponding to the permanently attached form of the invention shown in Figs. 1, 2 and 3.

In sighting a shotgun or in pointing any other article having only a front sight or no conventional sights at all at a moving target it is recommended by expert wing shooters that binocular vision be used in order that the distance to the target may be constantly judged while the direction and apparent speed of movement of the target are observed in preparing to fire.

This recommended method of wing shooting affords the decided advantage of judging distance to the target but imposes an element of difficulty because the front sight may appear as a double image and when the shooting eye (usually the right eye) is weaker than the left eye there is a confusing tendency of the stronger left eye to assume command of the faculties involved so that the gunner may actually align the wrong image on the target with his left eye and miss the actual target when he fires.

Heretofore known methods and devices for assisting in binocular vision have left much to be desired since they either propose to handicap the stronger, non-shooting eye or they obliterate a relatively important portion of the target background area in which a wing target may be lost at a critical instant.

By the means of the invention a small binocular shooting aid avoids the aforementioned difficulties while making available the important advantage of constantly and continuously enabling the shooter to accurately judge the distance to the moving target.

The device of the invention may be adapted to any known type of shotgun and it consists essentially of a fin-like element arranged, as will be hereinafter detailed, as desired, for permanent mounting or for demountable attachment to the gun barrel on the forward upper part thereof in the proximity of the front sight or of the normal location of a front gun sight. From this it is to be understood that the invention is not to be considered as limited to use on any particular gun nor to a single barrelled gun which is herein shown by way of example and not by way of limitation.

Each and every embodiment of the aforesaid fin has the essential feature of presenting a different image to each of the gunner's eyes in a way that the shooting eye will see a front sight to be aligned on the target, while the non-shooting eye will receive an image in which the front sight is invisible to it and instead will see an inconspicuous detail in the target area where said non-shooting eye would otherwise see the front gun sight or the sighting front end of the barrel as a double image.

While in the broader aspects of the invention it is of little consequence which of the distinctive images of the fin is presented to the respective eyes of the gunner, it is considered simpler and easier in practice to have the gun-aligning eye or shooting eye (usually the right eye) to view the end edge elevation of the fin on those guns that have a front gun sight or bead, while on guns that have no front sight, the end edge elevation of the fin is presented to the non-shooting eye (usually the left eye). Since the fin is thin, and at a considerable distance from the eye in shooting a gun, the image of the end edge elevation of the fin is small and is practically unnoticeable to the gunner when shooting in the woods or in the field at a moving target. In those wing shots in which the sky forms the background of the target area that image cannot obscure an appreciable part of the wing target or the background area.

Reference is now made to the drawings and particularly to Figs. 1, 2 and 3 which are concerned with shotguns having a front bead. The muzzle end portion 10 of the shotgun barrel has a bead sight 11. When the particular gun has a rib 12 along the top of the barrel said bead 11 is mounted on the rib. Otherwise the bead is mounted directly on the barrel in known manner. The permanently mounted form of the invention comprises a thin metal fin 13 in lengthwise parallelism with the center axis of the barrel 10 and with one longitudinal edge 14 uppermost and slightly higher than the top of bead 11. The bottom edge (not seen) is suitably fixed to or into the rib 12 on the barrel in any approved fashion as by brazing or hard solder or some approved mechanical connection.

Most guns are intended for right hand shooting and the specific description hereinafter pertains to such guns.

In the case of guns for left hand operation and/or aiming with the left eye it will be understood that the fin would be located accordingly.

Fin 13 is disposed slightly rearwardly of the bead 11 and slightly to the left thereof so that the profile image of the bead may be seen with the right eye in the usual manner and fully illuminated by any existing light to the left of the gunner since the location of the forward end of the fin prevents shading of the bead from casual illumination. In aiming with binocular vision the gunner's left eye will see the image of the aforeshortened side elevation of the left hand major face 16 of the fin and due to the location and position of the fin the face 16 subtends the angle of vision of the gunner's left eye sufficiently to block out the area in which it would otherwise see the front sight bead 11. In this embodiment the face 16 is treated or conditioned, to assure that the respective eyes of the gunner will receive distinct and different images at the critical place, by giving to said surface a smooth surface reflective or bright mirrored polish. In the event the fin is made of stainless steel it is found sufficient and effective to make face 16 smooth and well polished to render it bright and reflective. Under such a condition light reflected from some portion of the landscape in the target background area and to the left of the target will strike the mirrored surface 16 and the color and image will be seen as a reflected image by the left eye of the gunner as a tiny and inconsequential oddity in the target background area but always imposed therein with no distraction to the act of aiming with binocular vision because the color of this oddity is compatible with and derived from the casual adjacent landscape of which the true target background is a continuation. Thus the left eye will be effective to assist in judging distance to the target and the gunner will be quite undisturbed by the resultant minute area of falsity in the view of the target area regardless of its color. Obviously the reflected image is so small that under the most unfavorable conditions it could appear only as an odd speck of color contrasting to the general color or various colors in the background area. This odd shape or speck also does not have the specific shape of the bead or ball sight 11.

By reference to Fig. 3 it will be noted that a target, viz a clay pigeon 18 is seen by the right eye with the bead 11 of the gun immediately below the target and the thin rear end edge 17 of fin 13 (shown in exaggerated thickness by a single line) located at the left side of the bead, both members 17 and 11 projecting upwardly from the curve of the top front end of gun barrel 10. The portion just described is that which is seen in aiming the gun with the right eye alone when the left eye is closed. If now the gun be held pointing at the target and the left eye is opened and the right eye is closed the target 18 remains in the same position but the front end of the gun appears appreciably to the right of the target and is seen to present an image approximately as shown at the right hand side of the bracketed Fig. 3. In that image the foreshortened side elevational view of the side 16 is clearly seen by the left eye and some tiny portion x of the background area will present its reflected image on the side face 16 and will be seen to the exclusion of the bead 11.

When both eyes are open while aiming the gun at the target the result (not readily illustratable in line drawings) will be the merged images of the barrel, the image of the target and the bead 11 with the thin edge 17. Depending on conditions of incidental out of doors light and of the steadiness of the focus of both eyes on the target the image reflected from the side face 17 becomes relatively unnoticeable but the possibility of securing a doubled view of bead 11, and in consequence deluding the gunner's eyes by setting up the illusion of an additional target adjacent the true object, is completely impossible regardless of which of the gunner's eyes may be the stronger. The full field of vision is open and the target is seen binocularly at its proper distance.

The disadvantage of conventional binocular shooting is schematically illustrated in Fig. 7 wherein it will be observed that, unlike Fig. 3, the left and the right eyes both see the bead 11 from slightly different angles and that the chances of seeing the doubled image of the bead are readily possible and frequently appear in practice much to the confusion of the gunner who is intent on keeping the gun aimed at the moving target.

The arrangement of Figs. 1 and 2 is obtained as a demountable binocular shooting aid device 19 as exemplified in Fig. 8. In this embodiment the fin 20 is in all respects comparable to fin 13 in Fig. 1 but it is struck upwardly from a single sheet of metal shaped to form integral clasps 21 arranged in pairs together with a connecting body 22. A hole 23 may be provided to have the bead of a gun pass therethrough when the clasps 21 encircle the gun barrel of conventional type. It is to be understood that the fin and its mounting elements may be structurally varied to suit special types of gun in suitable fashion and that while the device of Fig. 8 is shown as a one-piece removably mounted device as a matter of simplification, it may be otherwise constructed if desired.

Reference is now made to Figs. 4, 5 and 6 which relate to the permanently mounted form of the invention that is adapted to guns which do not have a front gun sight but where the barrel 24 may have a sighting rib 25 along the top. In this embodiment the fin 26 is disposed on the forward upper portion of the rib 25 so as to present the thin rear end edge 27 to the left eye or non-aiming eye, while the specially treated side face 28 is seen in foreshortened side elevation by the right eye or aiming eye at a very acute angle so that the image received by the right eye is equivalent to a front gun sight. The special treatment of face 28 is desirably a suitable series of vertical ribs or serrations and a distinctive bright color e. g. red, or gold covering the ribbed side 28. The right eye thus sees a distinctively shaped and distinctively colored image while the left eye sees none of the color and only a thin colorless line. The target area is unobstructed so that distance to the target 29 (see Fig. 6) may be constantly judged during the practice of binocular shooting. In this embodiment again it is impossible for the gunner to obtain a doubled image.

In all cases I prefer to uniformly round the top front and rear corners of the fins and to keep the end edges rather sharp to afford a minimum of surface from which light may be reflected to the non-shooting eye.

The surfaces of the fins and their mounting means other than those specifically described hereinbefore are desirably blackened or darkened to approximately the color of a gun barrel.

While the fin 13 (Fig. 1) and fin 26 (Fig. 4) are both shown to be vertical it will be understood that the latter fin 26 may, if desired, be inclined slightly to the left at its top horizontal edge to obtain full advantage of casual random light to illuminate the treated and/or colored face 28.

It will be readily understood without further illustration that a fin such as 26 may be provided with demountable fastening means or clips as suggested and shown in Fig. 8. With minor modifications either form of the invention may be adapted to any style or type of any kind of gun whether single or double barrelled and having either ribs, or sights or both or neither of them.

The demountable forms of the device as in Fig. 8 may be readily applied to and removed from a gun barrel without marring the barrel by placing the ends of a piece of paper, e. g. a dollar bill between the clasp members 21 and the barrel and sliding the device on or off of the barrel.

What is claimed is:

1. The combination with a shotgun having a barrel carrying an existing front sight such as a ball sight, of an elongated, thin sheet metal fin of uniform thickness mounted on the upper front end of the barrel behind the ball sight and to one side of and substantially parallel to the vertical plane that contains the longitudinal center axis of said gun barrel and positioned on the barrel so as to present to the aiming eye of a user, aiming the gun with binocular vision, the thin imperceptible body of the fin at one side of the profile of the existing ball sight, while presenting to the non-aiming eye of the user one longitudinal side of said fin that conceals the ball sight from said non-aiming eye, and a light reflective surface for the said longitudinal side of the fin.

2. The combination as set forth in claim 1, characterized by the fact that the entire side of the fin presented to the non-aiming eye of the user has a true flat plane surface with bright polished mirror reflective properties.

References Cited in the file of this patent

UNITED STATES PATENTS

| | | |
|---|---|---|
| 33,965 | Stillman | Dec. 17, 1861 |
| 267,418 | Gilbert | Nov. 14, 1882 |
| 289,081 | Gilbert | Nov. 27, 1883 |
| 358,734 | Decumbus | Mar. 1, 1887 |
| 696,962 | Hamilton | Apr. 8, 1902 |
| 1,275,730 | Pasznicki | Aug. 13, 1918 |
| 2,056,469 | King | Oct. 6, 1936 |